United States Patent [19]

Robertson

[11] 4,286,906
[45] Sep. 1, 1981

[54] ADJUSTABLE BALANCE, EXTENSION BOAT TRAILER

[76] Inventor: Merrill L. Robertson, 3244 McGraw St., San Diego, Calif. 92117

[21] Appl. No.: 69,727

[22] Filed: Aug. 27, 1979

Related U.S. Application Data

[63] Continuation-in-part of Ser. No. 862,743, Dec. 21, 1977, abandoned.

[51] Int. Cl.³ .............................................. B60P 3/10
[52] U.S. Cl. .................................... 414/477; 414/484
[58] Field of Search ................. 280/80 B, 414 R; 9/1, 9/2; 414/477, 478, 479, 480, 484

[56] References Cited

U.S. PATENT DOCUMENTS

| 2,825,522 | 3/1958 | Bolmes | 280/414 R |
| 3,097,755 | 7/1963 | Fulcher | 414/478 |
| 3,127,041 | 3/1964 | Flynn | 414/477 |
| 3,812,988 | 5/1974 | Pyle | 414/477 |

Primary Examiner—Richard A. Schacher
Attorney, Agent, or Firm—Brown & Martin

[57] ABSTRACT

A boat trailer in which a boat is supported on a carriage, which in turn is roller supported on a wheeled chassis and is extended from the chassis to launch or recover the boat without the trailer wheels entering the water. The trailer wheels are mounted at a fixed position on the chassis and the primary carriage supporting rollers are directly over the trailer wheels, so that the load is concentrated at the trailer wheels during loading and unloading and tipping loads on the trailer and towing vehicle are minimized. A ground engaging roller supports the rear end of the carriage when extended, the forward end of the carriage having a ramp which allows the carriage to be lowered close to and parallel to the ground when fully extended. Adjustment is provided for the bow snubbing post and for the loaded position of the carriage, which allows the trailer to accommodate boats in a wide range of sizes with the load substantially balanced over the trailer wheels.

11 Claims, 10 Drawing Figures

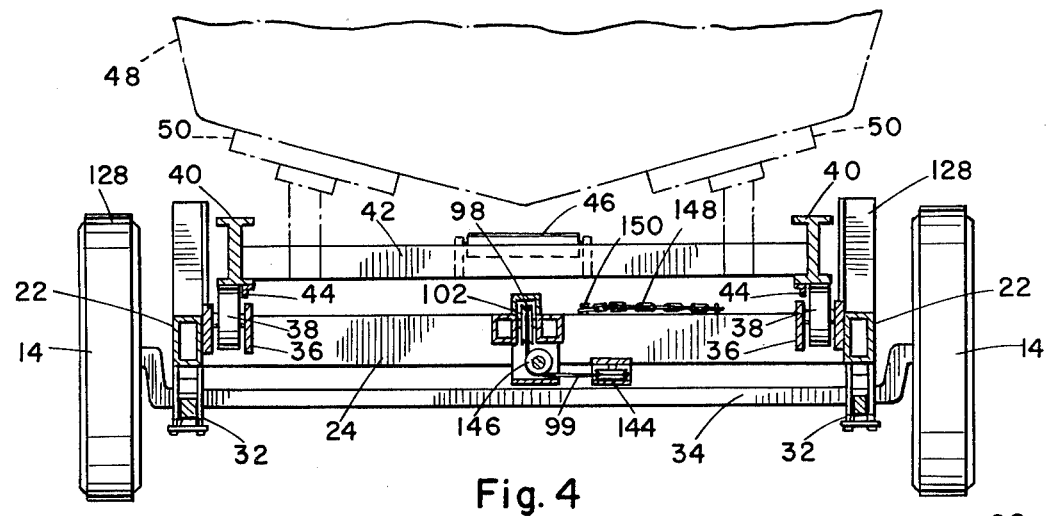
Fig. 4
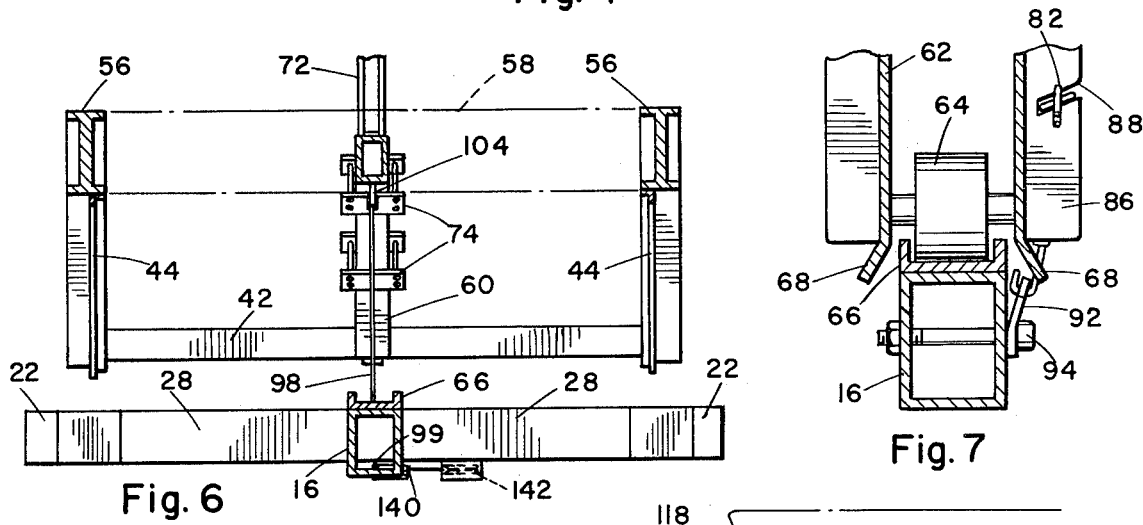
Fig. 6
Fig. 7
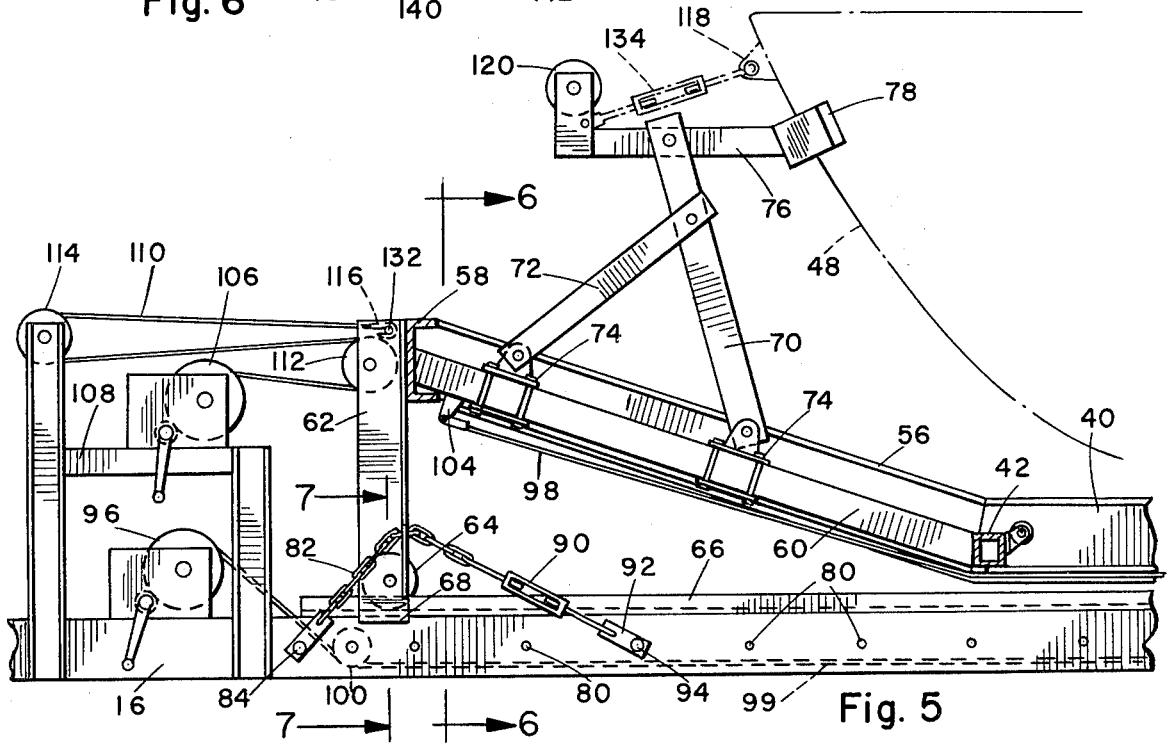
Fig. 5

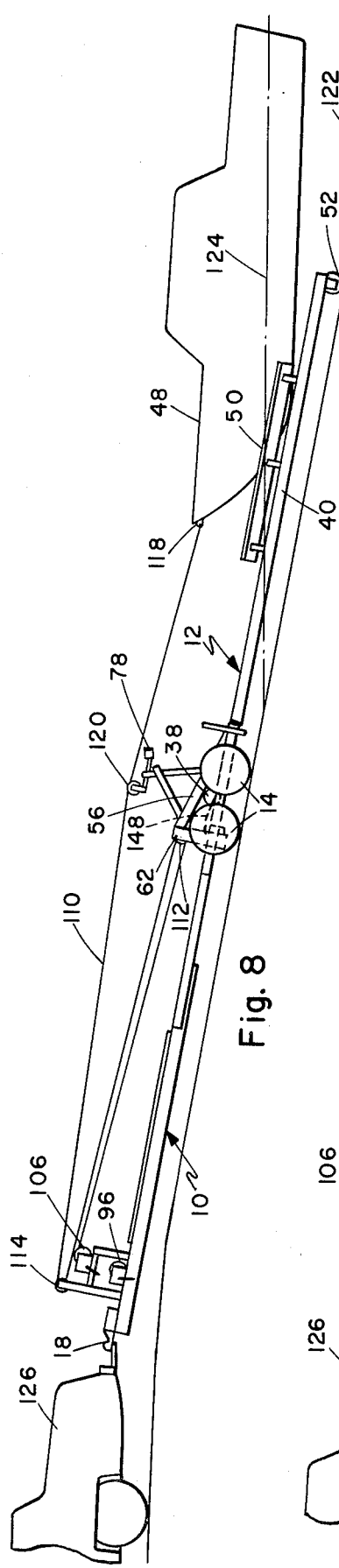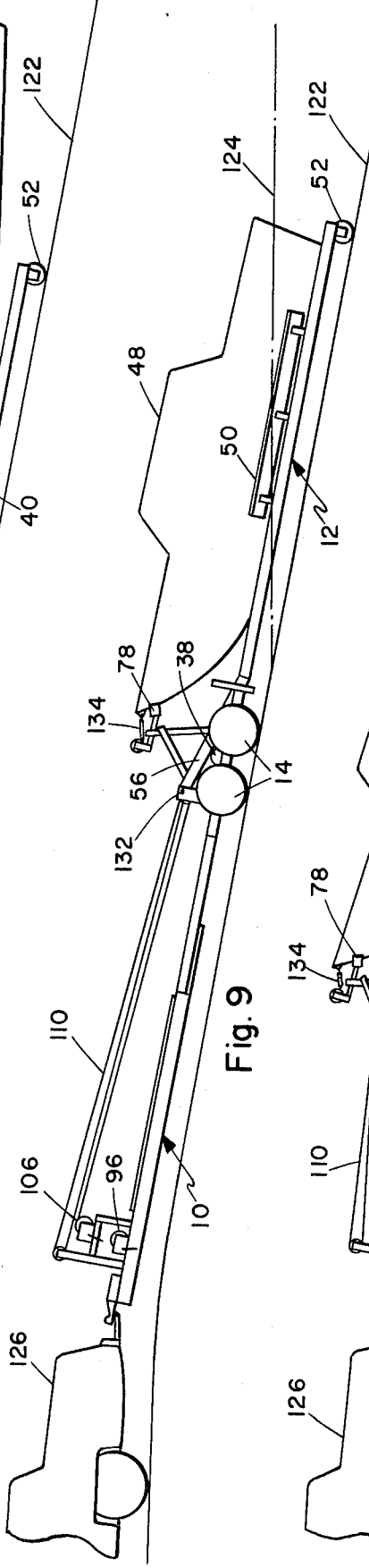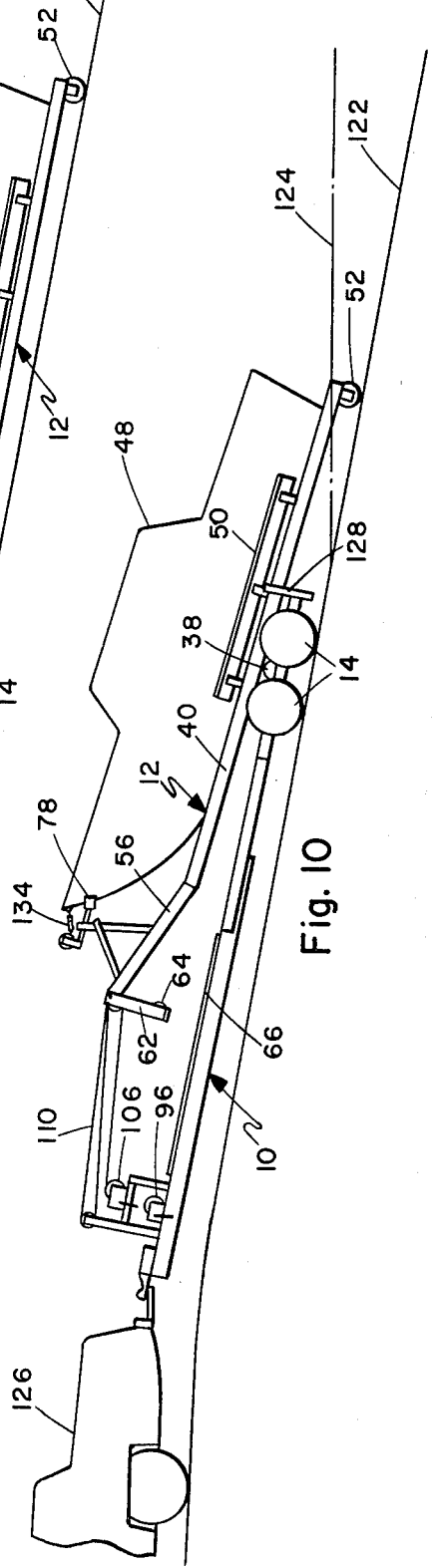

ADJUSTABLE BALANCE, EXTENSION BOAT TRAILER

REFERENCE TO OTHER APPLICATION

This is a continuation-in-part of application Ser. No. 862,743, filed Dec. 21, 1977 and entitled "Adjustable Balance, Extension Boat Trailer", now abandoned.

BACKGROUND OF THE INVENTION

Some simple types of boat trailers must be at least partially immersed in water to allow the boat to be floated on and off the trailer. Unless great care is taken, water can get into wheel bearings and brakes, salt water being particularly destructive. Other boat trailers have rear roller assemblies which allow a boat to be launched and recovered without the trailer entering the water. However, the stress on a boat being pulled over such rollers is considerable. The pressure against the rollers is concentrated in a small area of the hull and the structure is subjected to bending stresses forward and aft of the rollers. The technique is practical only for a small boat, since the boat will normally be at a steep angle relative to the trailer when the center of mass passes forward of the rollers, and the bow must be gently lowered as the center of mass passes forward of the rollers. Since the rollers must be at the extreme rear of the trailer, the load is concentrated behind the trailer wheels, which imposes a lifting action at the towing hitch.

Other types of trailers, more suitable for large boats, have extension means such as a frame or cradle which can be extended behind the main trailer structure to provide better support for the boat while loading and unloading. Such structures often have multiple rollers, mechanisms for tilting and guiding the extension, and are usually complex and heavy. Also, the extension usually rides on rollers or other supports positioned at the rear of the trailer behind the road wheels. This again results in an upward load at the towing hitch, with the weight of the extension added to that of the boat. If the upward load is sufficient it can break the hitch, or at the least lift the rear of the vehicle off the ground. Since the vehicle parking brake is usually effective on the rear wheels only, it is possible for the entire combination of boat, trailer and vehicle to roll into the water.

In the loaded position it is desirable to have the mass of the boat generally balanced about the road wheels, in order to minimize the loads on the towing hitch and vehicle. As a result, a particular boat trailer is limited to boats in a rather narrow range of sizes and a manufacturer will often have a series of trailers in different lengths and widths for specific classes of boats. Some specialized trailers have provision for balancing the weight distribution in the loaded condition by actually moving the road wheels along the chassis to suit a particular boat. This makes load distribution during loading and unloading even more uncertain, since the boat support roller position can vary relative to the road wheels.

SUMMARY OF THE INVENTION

The boat trailer described herein is capable of handling boats in a wide range of sizes and weights, with good load balance and with maximum, well distributed support for the boat while loading and unloading. The trailer comprises a simple chassis with a towing hitch and road wheels at a fixed position on the chassis, and carrying winch apparatus by which the boat handling operation is controlled. Mounted on the trailer is a carriage which extends substantially the full length of the trailer and has supporting means for holding boats of many different sizes. The carriage is primarily supported on rollers which are located directly over the road wheels at all times, so that the load is carried on the main trailer support base and upward and downward loads at the hitch are minimized during the major portion of the loading and unloading operation.

In the loaded position the forward end of the carriage is supported on a forward guide roller riding on the chassis. Provision is made for longitudinally adjusting the loaded position of the carriage, so that the weight of the boat can be substantially balanced over the road wheels. The carriage also has an adjustable bow snubbing post for accommodating boats of various sizes on the support structure of the carriage.

An unloading winch mounted near the towing hitch is used to extend the carriage, the rear end of which has a ground engaging roller. The entire structure is low to the ground so that the tilt angle of the carriage is very small as it is extended to reach the ground. The loading winch, also at the towing hitch location, can be used to control the carriage as the rear end is lowered to the ground, when the center of mass of the boat moves aft of the primary support rollers.

The forward end of the carriage has an inclined ramp portion, which rides on the support rollers when the carriage approaches the extended position and allows the carriage to be dropped very low and parallel to the ground in the fully extended position. When the carriage is fully extended, the boat is entirely behind the chassis and can be put into the water without the trailer road wheels entering the water. The low position of the carriage allows the boat to be floated on and off the carriage with little effort.

The primary object of this invention, therefore, is to provide a new and improved adjustable balance, extension boat trailer.

Another object of this invention is to provide a boat trailer in which a boat is supported on a carriage which rides on support rollers positioned over the trailer road wheels in order to concentrate the load over the trailer wheels for stability and balance, and so that loads on the towing hitch are minimized during loading and unloading.

Another object of this invention is to provide a boat trailer in which the boat, on its supporting carriage, is extended completely behind the trailer to enter the water without the trailer wheels being in the water.

Still another object of this invention is to provide a boat trailer which will accommodate boats in a very wide range of sizes, and has adjustment means for balancing the load of any boat over the primary support on the trailer.

A further object of this invention is to provide a boat trailer which supports the load in such a manner that stresses on the towing vehicle are minimized, even with a large boat on the trailer.

Other objects and advantages will be apparent in the following detailed description, taken in conjunction with the accompanying drawings, in which:

FIG. 4 is an enlarged sectional view taken on line 4—4 of FIG. 1.

FIG. 5 is an enlarged sectional view taken on line 5—5 of FIG. 2.

FIG. 6 is a sectional view taken on line 6—6 of FIG. 5.

FIG. 7 is an enlarged sectional view taken on line 7—7 of FIG. 5.

FIG. 8 is a side elevation view of the trailer with the carriage fully extended and the boat floated in the water.

FIG. 9 is a view similar to FIG. 8, but with the boat loaded and snubbed on the still extended carriage.

FIG. 10 is a further side elevation view showing the carriage partially retracted.

DESCRIPTION OF THE PREFERRED EMBODIMENT

Figure 1:
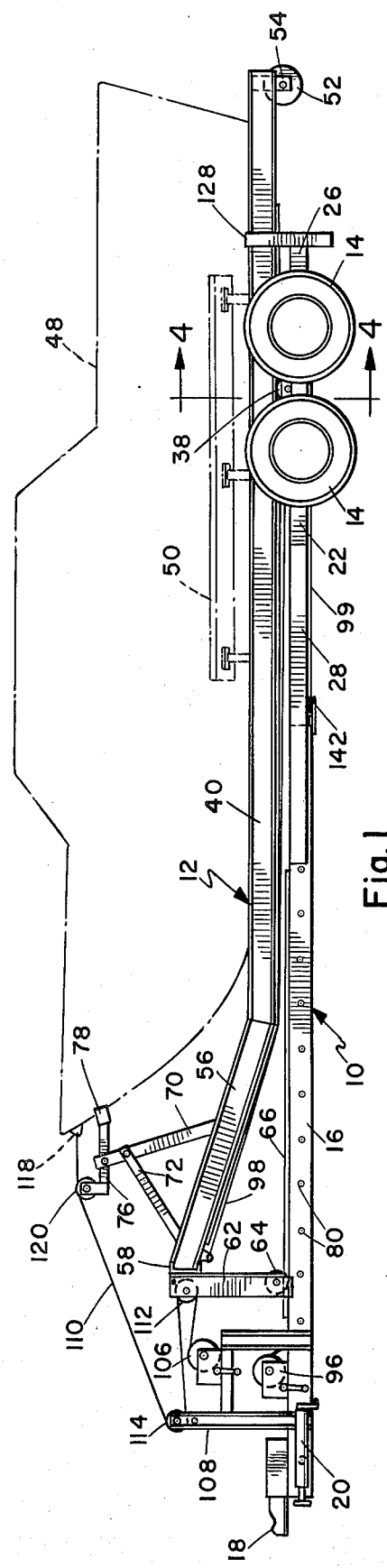
FIG. 1 is a side elevation view of the complete trailer in the loaded position.
Figure 2:
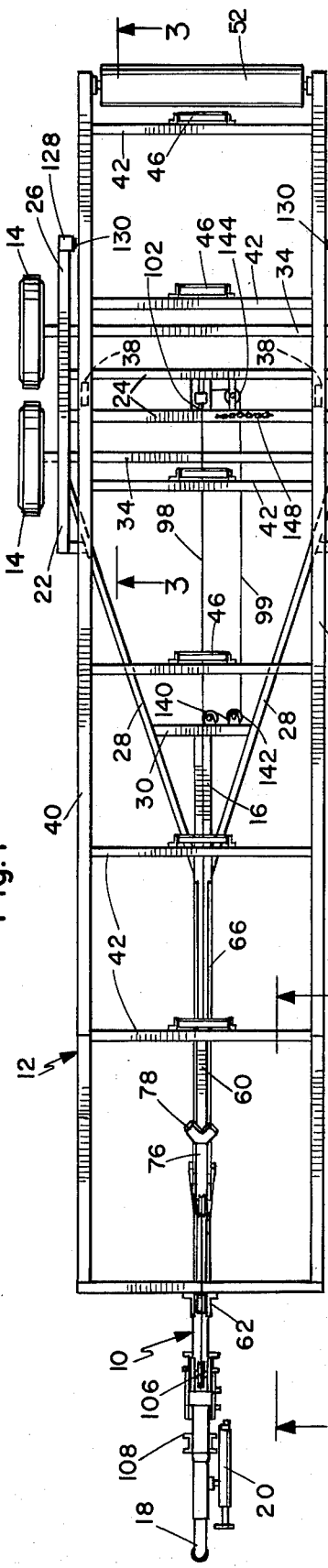
FIG. 2 is a top plan view of the trailer in the position of FIG. 1.

The boat trailer comprises two major components, a chassis 10 and a carriage 12. The chassis 10 is supported on road wheels 14 at a fixed position near the rear end of the structure, dual wheels being preferred, as illustrated, for better balance and to handle various sizes of boats. To minimize weight the forward portion of the chassis comprises a box section boom 16, at the forward end of which is a conventional trailer hitch 18. A jack 20, also of conventional type, is mounted on one side of the boom 16 to support the forward end of the trailer when detached from the towing vehicle.

The rear portion of chassis 10 comprises a rectangular frame having box section side rails 22 joined by a pair of cross members 24, the side rails having rear extensions 26 projecting behind wheels 14, so that the rear portion of the chassis is open. Side rails 22 are connected to the boom 16 by diagonal members 28 and a cross brace 30. Any simple and convenient bracing structure may be used, the arrangement shown having been found capable of handling the necessary loads. Wheels 14 are mounted on conventional spring suspension 32, and have dropped axles 34 which allow the chassis to ride as low as possible between the wheels, as in FIG. 4.

Cross members 24 are spaced apart and substantially centered longitudinally between the wheels 14. Fixed between the cross members 24 adjacent each side rail 22 are bearing brackets 36, in which are mounted freely rotatable support rollers 38 for supporting the carriage 12, the support rollers being substantially centered over the support base of the wheels 14.

The carriage is a simple rectangular frame with I-beam side rails 40, joined by suitably spaced cross members 42 in a rigid structure. Side rails 40 are spaced to ride on top of support rollers 38 and fit inside the chassis side rails 22. Guide flanges 44 are fixed to the underside of side rails 40 to fit inside support rollers 38, as in FIG. 4, and guide the carriage in lateral alignment. Keel rollers 46 are mounted on the cross members 42 to prevent the keel of a boat from scraping on the carriage structure and to facilitate loading and unloading.

A boat 48 is primarily supported on cradles 50 which are mounted in a suitable manner on the carriage. Various types of cradles are well known and the specific type will depend on the hull configuration of the particular boat.

At the rear end of the carriage 12 is a ground engaging rear roller 52, rotatably mounted between and below side rails 40 on bearing plates 54. The forward ends of side rails 40 have upwardly inclined ramp portions 56, joined at the forward ends by a front cross beam 58. Fixed between the cross beam 58 and the forwardmost cross member 42 is a center rail 60, parallel to and centrally spaced between ramp portions 56. Fixed to the center of cross beam 58 is a downwardly extending front post 62, having at its lower end a front support roller 64. The roller 64 rides in a channel 66 along the top of the boom 16 when the carriage is at or near the loaded position. To guide the roller 64 into channel 66, the lower end of front post 62 has downwardly diverging wings 68 which straddle boom 16, as in FIG. 7.

Mounted on center rail 60 is an upwardly extending snubbing post 70 supported by a diagonal brace 72. Both the post 70 and brace 72 are secured to the center rail by longitudinally adjustable clamp brackets 74. At the top of post 70 is a substantially horizontal arm 76, on the rear end of which is a generally V-shaped snubbing block 78, to receive the bow of boat 48. By adjusting clamp brackets 74 along the center rail 60, the position of the snubbing block 78 can be adjusted to suit different lengths of boats, in order to position a particular boat in good balance on cradles 50 and on the carriage. The height of the snubbing block is also adjustable by varying the inclination of brace 72.

To balance the loaded boat over the trailer wheels 14 and minimize the downward load at hitch 18, the position of the loaded carriage can be adjusted along the length of the chassis. The boom 16 is provided with longitudinally spaced transverse holes 80, to which a tie chain 82 can be secured at one end by a bolt 84, in any desired hole position. Front post 62 has a side flange 86 in which is a downwardly and inwardly inclined locking notch 88, as in FIG. 7. The tie chain 82 is passed through the notch 88 with one link flat in the notch, and is thus locked against movement by the links straddling the flange 86, as in FIG. 5. The other end of tie chain 82 has a turnbuckle 90 and an end link 92, the end link being secured by a bolt 94 in another of the holes 80. When turnbuckle 90 is tightened the carriage is longitudinally secured on the chassis.

On the forward end portion of boom 16 is an unloading winch 96 of conventional type, which may be manually or power operated. An unloading cable 98 extends from winch 96, around a guide pulley 100, through boom 16, around a return pulley 102 rotatably mounted between cross beams 24, and back underneath carriage 12 to a fixed connector 104 on the forward end of center rail 60. Since the front post 62 drops down into the chassis at the rear position of the carriage, the lower reach 99 of unloading cable 98 must be offset to clear the post. At the rear end of boom 16 the cable is guided around a pair of laterally spaced pulleys 140 and 142 mounted horizontally on cross brace 30. The laterally offset lower reach 99 then passes around a pulley 144 mounted horizontally below cross members 24. From there the cable extends around a guide pulley 146 mounted below and perpendicular to return pulley 102, to guide the cable over the return pulley. Above winch 96 is a loading winch 106 on a support frame 108, the specific frame structure not being important. A loading cable 110 extends from winch 106 around a pulley 112 in the upper portion of front post 62 and back around a return pulley 114 on frame 108. The end of cable 110 has a hook 116 for attachment to the usual mooring eye 118 on the bow of the boat. When connected to the boat, the loading cable 110 extends over a guide pulley 120 on the forward end of the snubbing block arm 76. It should be noted that the specific arrangement of pulleys may vary, depending on the mechanical advantage required.

To launch a boat, the trailer is backed down the launching ramp 122 until wheels 14 are near the edge of the water 124, and is held in that position by the towing vehicle 126, as in FIG. 8. Unloading winch 96 is operated to reel in cable 98 and pull the carriage rearwardly. In the initial stage the load is supported on rollers 38 and front roller 64. As the center of gravity of the carriage and boat moves rearwardly of support rollers 38, the rear of the carriage 12 swings down until rear roller 52 rests on the ramp 122. Thus, during the major portion of the unloading operation the load is concentrated on support rollers 38, directly over the support base of the trailer road wheels 14, which minimizes any upward load on the towing vehicle. The loading winch 106 is either released or can be retarded to control the movement of the carriage during unloading.

Figure 3:
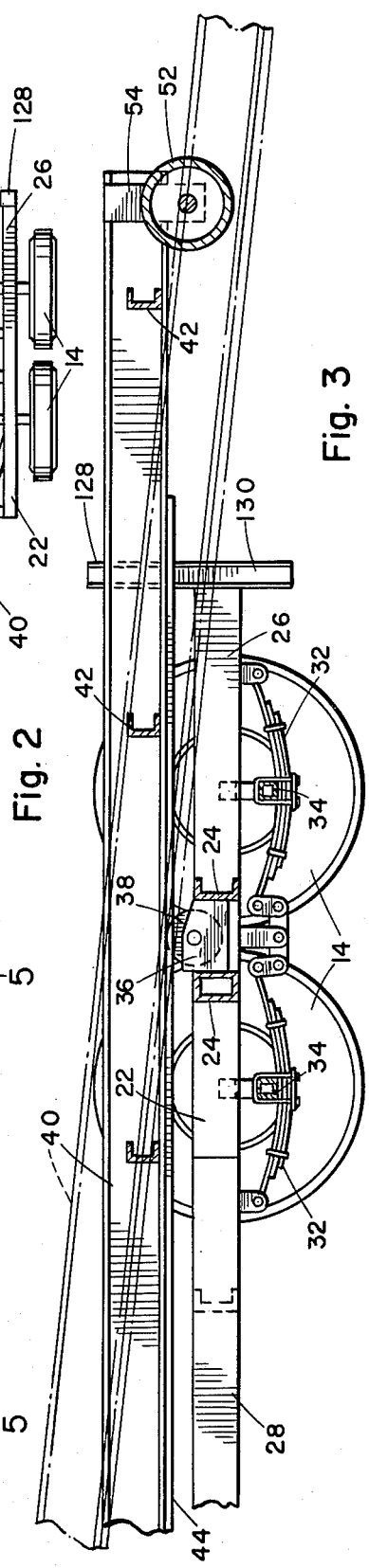
FIG. 3 is an enlarged sectional view taken on line 3—3 of FIG. 2.

As the carriage tilts, the side rails 40 pass down between rear extensions 26 of the chassis, as indicated in the broken line position in FIG. 3. To prevent side sway of the carriage, upright guide posts 128 are mounted on the rear ends of extension 26, with inner rubbing strips 130 to engage the side rails 40. Rollers could be used in place of the rubbing strips if desired.

When the carriage tilts, the front roller 64 is lifted out of track 66 and the load is then carried by the support rollers 38 and rear roller 52, as in FIG. 10. As rearward travel of the carriage 12 continues, the ramp portions 56 ride over rollers 38 and the carriage is lowered to the fully extended position close to and substantially parallel to the ramp surface. In the fully extended position, front post 62 drops into the chassis and engages the forward axle 34 to act as a stop for carriage travel. With the carriage fully extended to the rear, the cable 98 is somewhat slack on the winch 96 and could shift forward as a boat is loaded, making it difficult to load the boat. To prevent this it is desirable to have means for securing the carriage to the chassis in the aft position. This is easily accomplished by attaching a short length of chain 148 to one cross member 24 by a bolt 150, or similar retaining means. With the front post 62 stopped against axle 34, chain 148 can be hooked into slot 88 on the front post, in the manner that chain 82 is used in the forward position. The carriage is thus held securely in the aft position.

With the very low slung position of the carriage, the boat is easily floated off and is equally easily floated on to the carriage for reloading. Cable 110 may be attached to the boat for control, as in FIG. 8, which represents either the final stage of launching or the initial stage of recovery of the boat. In fact FIGS. 10, 9 and 8 in that order illustrate the launching steps, while FIGS. 8, 9 and 10 in succession show the recovery.

On a shallow launching ramp the boat can be floated all, or nearly all the way on the carriage, so that there is very little stress on the keel or lower hull. In other types of trailers the boat must be pulled over various arrangements of rollers, skids and other guides. The boat is pulled on to the carriage by loading cable 110 attached to eye 118, and is pulled forward by winch 106 until the bow is seated in snubbing block 78. To avoid unnecessary strain on the boat, the cable 110 is unhooked from eye 118 and the hook 116 is attached to an anchor pin 132 in the upper end of front post 62, as in FIG. 5. The boat is secured in the snubbing block by a turnbuckle 134, or similar means, connected between eye 118 and the arm 76. Chain 148 is then unhooked from post 62 so that the carriage is free to move. Continued operation of winch 106 then pulls the carriage forward, so that ramp portions 56 ride up over support rollers 38 until the side rails 40 are over the support rollers.

As the center of gravity of the boat and carriage moves forward of rollers 38, the front roller 64 is lowered on to track 66, guided by wings 68. The carriage is then winched forward to the desired position and secured by tie chain 82. The carriage is positioned to suit the particular boat, so that the center of gravity of the loaded carriage is slightly forward of support rollers 38 and a minimum downward load is applied to the towing vehicle through the towing hitch.

The load balancing capability of the trailer makes it safe for use by people who are relatively inexperienced in boat handling and may not take the necessary precautions when launching or retrieving a boat. The safety was confirmed in an actual test using a trailer constructed as illustrated in the drawings and having a length of about 28 feet, with a 5000 pound boat loaded on the carriage. To demonstrate the minimal load characteristics most vividly, the trailer was disconnected from the towing vehicle and restrained only from rolling, with the front end supported on jack 20. The boat was then unloaded in the manner described above.

With the carriage and boat well extended, but before rear roller 52 contacted the ground, the front end of the chassis rose about 6 inches. This was apparently due to the high attachment point of the cable 110 around return pulley 114, causing an upward pull. However, the deflection was negligible and the actual force very low and the chassis returned to the horizontal position as soon as rear roller 52 contacted the ground. At no time did the trailer wheels leave the ground, the very small deflection being taken up by the spring suspension.

While a boat trailer would not normally be detached from the towing vehicle for launching and retrieving a boat, the test did emphasize the safety and ease with which the operation can be conducted. Existing types of boat trailers with rollers or other support means rearwardly on the road wheels could certainly not be operated in this manner.

It will evident, therefore, that the major portion of the load is applied to the support rollers 38, directly centered over the wheel base of the trailer, during launching, recovery and in road travel. This minimizes upward and downward loads on the vehicle and prevents undesirable bouncing and rocking of the trailer while under tow.

It should be understood that the structure illustrated is exemplary and that details may vary according to the materials and construction techniques used.

Having described my invention, I claim:
1. An adjustable balance, extension boat trailer, comprising:
an elongated chassis having a rear frame portion with supporting wheels thereon, and boom extending longitudinally forwardly from the frame with hitch means thereon for attachment to a towing vehicle;
primary support rollers mounted on opposite sides of said frame in substantially vertical alignment, along the longitudinal axis of said chassis, with the center of support of said wheels;

an elongated carriage mounted on said chassis with longitudinal side rails spaced to ride on said primary support rollers;

unloading and loading means on said chassis for respectively extending said carriage rearwardly from and retracting the carriage forwardly on to the chassis;

the forward ends of said side rails having upwardly inclined ramp portions for riding on said primary support rollers and lowering the carriage close to the ground in the rearwardly extended position of the carriage;

said carriage having a rear end portion with a ground engaging rear roller rotatably mounted thereon;

said carriage having a forward portion with a front roller rotatably mounted thereon;

said boom having longitudinal guide means for receiving said front roller;

and said carriage having means for supporting and securing a boat thereon.

2. A boat trailer according to claim 1, and including a front cross member connecting the forward ends of said ramp portions, and a post extending downwardly from the front cross member;

said front roller being mounted on the lower end of said post.

3. A boat trailer according to claim 2, wherein the lower end of said post has guide means for engaging said boom and aligning the front roller therewith.

4. A boat trailer according to claim 1, and including a center rail fixed in said carriage between and parallel to said ramp portions;

and snubbing means for receiving and holding the bow of a boat, said snubbing means being longitudinally adjustable on said center rail.

5. A boat trailer according to claim 4, wherein said unloading means includes an unloading winch on said chassis, with a cable connected to said carriage for pulling the carriage rearwardly on the chassis.

6. A boat trailer according to claim 5, wherein said loading means includes a loading winch on said chassis, with a cable having means for selective attachment to a boat and to said carriage, for pulling a boat on to the carriage and for retracting the carriage on to the chassis.

7. A boat trailer according to claim 1, wherein the rear portion of said chassis has side rail extensions spaced for said carriage to pass therebetween, and guide posts on the rear ends of said extensions for restraining the carriage against lateral movement.

8. A boat trailer according to claim 7, wherein said carriage side rails have longitudinal guide flanges on the underside thereof, said guide flanges engaging said support rollers to retain the carriage thereon.

9. A boat trailer according to claim 5, and including retaining means for securing said carriage to said chassis in the rearwardly extended position of the carriage, to hold the carriage selectively against longitudinal displacement.

10. An adjustable balance, extension boat trailer, comprising:

an elongated chassis having a front portion with hitch means for attachment to a towing vehicle, and a rear portion with supporting wheels rotatably mounted in a fixed position thereon;

primary support rollers rotatably mounted in a fixed position on said chassis in substantially vertical alignment, along the longitudinal axis of said chassis, with the center of support of said wheels;

an elongated carriage mounted on said chassis to roll longitudinally on said support rollers, which constitute the primary support for the carriage at all positions;

said carriage having means for supporting and securing a boat thereon;

and unloading and loading means on said chassis for respectively extending said carriage rearwardly from and retracting the carriage forwardly onto the chassis.

11. A boat trailer according to claim 10, and including securing means for holding said carriage at selected longitudinal positions on said chassis, and means on said carriage for holding a boat at selected longitudinal positions on the carriage.

* * * * *